United States Patent
Noguchi et al.

(10) Patent No.: US 10,801,949 B2
(45) Date of Patent: Oct. 13, 2020

(54) OPTICAL ANALYSIS APPARATUS AND MANUFACTURING SYSTEM FOR A SUBSTANCE

(71) Applicant: Hitachi, Ltd., Chiyoda-ku, Tokyo (JP)

(72) Inventors: Toshimitsu Noguchi, Tokyo (JP); Takuya Kambayashi, Tokyo (JP); Shinichi Taniguchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 84 days.

(21) Appl. No.: 15/940,140

(22) Filed: Mar. 29, 2018

(65) Prior Publication Data

US 2019/0162654 A1   May 30, 2019

(30) Foreign Application Priority Data

Nov. 27, 2017   (JP) .................................. 2017-227029

(51) Int. Cl.
*G01N 21/27* (2006.01)
*G01N 21/85* (2006.01)

(52) U.S. Cl.
CPC ............. *G01N 21/27* (2013.01); *G01N 21/85* (2013.01); *G01N 2021/8557* (2013.01); *G01N 2021/8578* (2013.01)

(58) Field of Classification Search
CPC .. C08L 25/06; C08L 2203/30; C08L 2205/06; C08L 2207/04; C08L 9/06; A61B 10/0038; A61B 10/0096; A61B 2560/0412; A61B 2562/02; A61B 5/0008; A61B 5/0042; A61B 5/0046; A61B 5/0075; A61B 5/0077; A61B 5/0079; A61B 5/01; A61B 5/015; A61B 5/1176; A61B 5/14532; A61B 5/14546; A61B 5/14551; A61B 5/1491; A61B 5/4064; A61B 5/4076; A61B 5/412; A61B 5/6803; A61B 5/6814; A61B 5/6821; A61B 5/6891; A61B 5/6898; A61B 5/7246; A61B 5/7282; A61B 5/742; A61B 5/746; A61B 5/15003; A61B 5/150229; A61B 5/150755; A61B 5/153; A61B 5/157; A61B 5/14557; A61B 5/150221; A61B 5/1455; A61B 5/150236; A61B 5/150992; A61B 5/150267; A61B 5/155; A61B 5/1459; A61B 5/150786; A61B 5/6866; A61B 5/0059; A61B 2562/0233; A61B 2562/0238; A61B 5/1427; A61B 5/14552; A61B 2560/0228; A61B 5/150244; A61B 5/150389; A61B 5/150503; A61B 5/150305; A61B 5/150824; A61B 5/150854; A61B 2560/0437; A61B 5/1495; A61B 5/4839; A61B 2560/0443; A61B 5/14535; A61B 5/150862; A61M 16/104; A61M 16/18; A61M 2016/1035; A61M 2205/18; A61M 2205/3375; A61M 16/024; A61M 16/12; A61M 2016/1025; A61M 2202/0208; A61M 2202/0283; A61M 2205/3331; A61M 16/16; A61M 2016/003; A61M 2205/3334; A61M 5/1415; A61M 5/1723; A61M 39/10; A61M 2005/14208; A61M 2039/1033; A61M 39/1011; A61M 5/142; A61M 2205/12; A61M 2205/128; A61M 2230/201; A61M 5/16827; A61M 2039/1077; A61M 2039/1094; A61M 39/02; A61M 2039/1027; A61M 2039/263; A61M 2205/0222; A61M 2205/0238; A61M 39/26; A61M 2205/50; A61M 2205/52; A61M 5/1452; A61M 2005/1726; C08K 5/09; C08K 5/098; B01L 2300/0681; B01L 2400/0478; B01L 2400/0683; B01L 3/5029; B01L 3/5082; E21B 49/081; E21B 2049/085; E21B 33/12; E21B 49/008; E21B 49/08; E21B 49/088; E21B 49/10; G01N 1/38; G01N 21/85; G01N 1/28; G01N 2021/036; G01N 2021/641; G01N 2021/8557; G01N 2021/8578; G01N 21/0303; G01N 21/251; G01N 21/255; G01N 21/27; G01N 21/31; G01N 21/534; G01N 21/59; G01N 21/645; G01N 21/78; G01N 2201/06153; G01N 33/146; G01N 2021/0346; G01N 21/03; G01N 21/07;

(Continued)

(56) References Cited

U.S. PATENT DOCUMENTS 3,810,695 A * 5/1974 Shea ...................... G01N 21/05
                                                                356/73
6,879,741 B2 * 4/2005 Salerno .............. G01N 21/8507
                                                                356/301

(Continued)

FOREIGN PATENT DOCUMENTS

JP         2009-294002 A      12/2009

*Primary Examiner* — Deborah K Ware
(74) *Attorney, Agent, or Firm* — Crowell & Moring LLP

(57) ABSTRACT

To perform more accurate analysis of a composition of a substance given at a sampling time, provided is an optical analysis apparatus, including: a flow passage, which is connected to a vessel, and is configured to allow a first substance to flow therethrough; an introduction unit, which is provided to the flow passage, and is configured to introduce at least two second substances to the flow passage, to thereby divide the first substance flowing through the flow passage; and a measurement unit, which is provided to the flow passage, and is configured to perform measurement by irradiating the first substance and the second substance flowing through the flow passage with light.

20 Claims, 13 Drawing Sheets

(58) Field of Classification Search
CPC ........ G01N 21/35; G01N 33/491; G01N 1/10; G01J 2003/1226; G01J 3/0205; G01J 2005/0077; G01J 5/10; G01V 3/30; G01V 5/107; G01V 5/108; G06F 3/011; G06F 3/012; G06F 3/013; G06F 3/017; G06F 3/0304; G06F 3/0481; G06F 3/0482; G06F 3/04842; G06F 9/30007; G06F 9/00335; G06F 19/3468; B60H 1/00735; B60H 1/00742; H04N 5/2256; H04N 5/33; H04N 7/18; B60K 28/06; B60T 7/14; B60W 2040/0818; B60W 2540/26; G16H 20/17; G16H 40/63; G16B 99/00; Y10T 436/11; Y10T 436/144444; Y10T 137/0318; Y10T 137/87692; B01F 13/0059; B01F 5/0646; B01F 5/0654

See application file for complete search history.

(56) References Cited

U.S. PATENT DOCUMENTS

| | | | | |
|---|---|---|---|---|
| 8,379,192 | B2* | 2/2013 | Mannhardt | G01N 21/15 356/73 |
| 10,098,548 | B2* | 10/2018 | Abreu | A61B 5/0008 |
| 10,227,063 | B2* | 3/2019 | Abreu | B60H 1/00742 |
| 2004/0119601 | A1* | 6/2004 | Colorado | G08B 5/224 340/815.4 |
| 2004/0204014 | A1* | 10/2004 | Colorado | H04M 1/22 455/550.1 |
| 2009/0257061 | A1* | 10/2009 | Wihlborg | G01N 21/78 356/433 |
| 2015/0094914 | A1* | 4/2015 | Abreu | B60H 1/00742 701/41 |

* cited by examiner

FIG. 5

| BUBBLE NUMBER | INTRODUCTION TIME (T1) | DETECTION TIME (T2') | SAMPLE NUMBER | SAMPLING TIME (T0) | MEASUREMENT TIME (T2) |
|---|---|---|---|---|---|
| 1 | *** | *** | 1 | *** | *** |
| 2 | *** | *** | 2 | *** | *** |
| 3 | *** | *** | 3 | *** | *** |
| ⋮ | ⋮ | ⋮ | ⋮ | ⋮ | ⋮ |

OPTICAL ANALYSIS APPARATUS AND MANUFACTURING SYSTEM FOR A SUBSTANCE

CLAIM OF PRIORITY

This application claims the priority based on the Japanese Patent Application No. 2017-227029 filed on Nov. 27, 2017. The entire contents of which are incorporated herein by reference for all purpose.

BACKGROUND OF THE INVENTION

The present invention relates to an optical analysis apparatus, a manufacturing system for a substance, and a manufacturing method for a substance.

Hitherto, among manufacturing steps for a substance, in a step of measuring, for example, a composition, a state, or a form of a substance in a reaction vessel, measurement is performed after extracting the substance from the vessel through use of an instrument such as a dropper, a syringe, or a tube.

In Abstract of Japanese Patent Laid-open Publication No. 2009-294002, the following description is given. "The in-situ XAFS analyzer is equipped with a stirrer with a heater for uniformly stirring a solution containing a very small amount of a substance and advancing a specific reaction in the solution, a measuring cell having not only an inflow port and an outflow port for the solution but also a storage part for the solution between the inflow port and the outflow port to maintain the uniformity of the solution and having a light receiving window for irradiating the solution in the storage part with incident X rays radiated from an X-ray source, a 7 element SDD capable of detecting the very small amount of substances in the solution on a spot by receiving fluorescent X rays radiated from the solution irradiated with X rays through the light receiving window, flow passages for allowing the stirrer with the heater and the measuring cell to communicate with each other, and a liquid feed pump which is provided in the middle of the flow passages and is configured to circulate the solution between the stirrer with the heater and the measuring cell."

SUMMARY OF THE INVENTION

There is difficulty in performing continuous measurement of the substance with the extraction of the substance using an instrument such as a dropper or a syringe. Further, when the substance is extracted by opening a lid of the vessel at the time of using the instrument such as a dropper or a syringe, gas is released to an outside of the vessel, or air enters the vessel, with the result that there is a high risk of causing, for example, change in composition of the substance in the vessel or contamination due to entry of dust or bacteria into the vessel.

Even when the substance is circulated through use of the flow passages connecting the vessel and the measuring cell to each other as in the apparatus described in Japanese Patent Laid-open Publication No. 2009-294002, the following problem arises. For example, consideration is made of a case in which a composition of the substance in the reaction vessel changes with time due to addition of gas, liquid, or a solid into the reaction vessel. In such a case, a substance which is sampled to the flow passage at a first time is mixed with a substance which is sampled before or after the first time while the substance which is sampled to the flow passage at the first time flows through the flow passage. That is, there is difficulty in performing accurate analysis of a composition of the substance given at the sampling time.

The present invention has an object to perform more accurate analysis of a composition of a substance given at a sampling time.

The present application includes a plurality of measures for solving at least part of the above-mentioned problem, and an example of the measures is given below.

According to one embodiment of the present invention, there is provided an optical analysis apparatus, including: a flow passage, which is connected to a vessel, and is configured to allow a first substance to flow therethrough; an introduction unit, which is provided to the flow passage, and is configured to introduce at least two second substances to the flow passage, to thereby divide the first substance flowing through the flow passage; and a measurement unit, which is provided to the flow passage, and is configured to perform measurement by irradiating the first substance and the second substances flowing through the flow passage with light.

According to the present invention, for example, even when a composition of the substance in the reaction vessel changes with time, more accurate analysis of a composition of the substance given at the sampling time can be performed.

A problem, a configuration, and an effect other than those described above are clarified through the following description of embodiments.

BRIEF DESCRIPTION OF THE DRAWINGS

FIG. 5 is an explanatory table for showing an example of a determination method for the sampling time.

DESCRIPTION OF THE PREFERRED EMBODIMENTS

Figure 1:
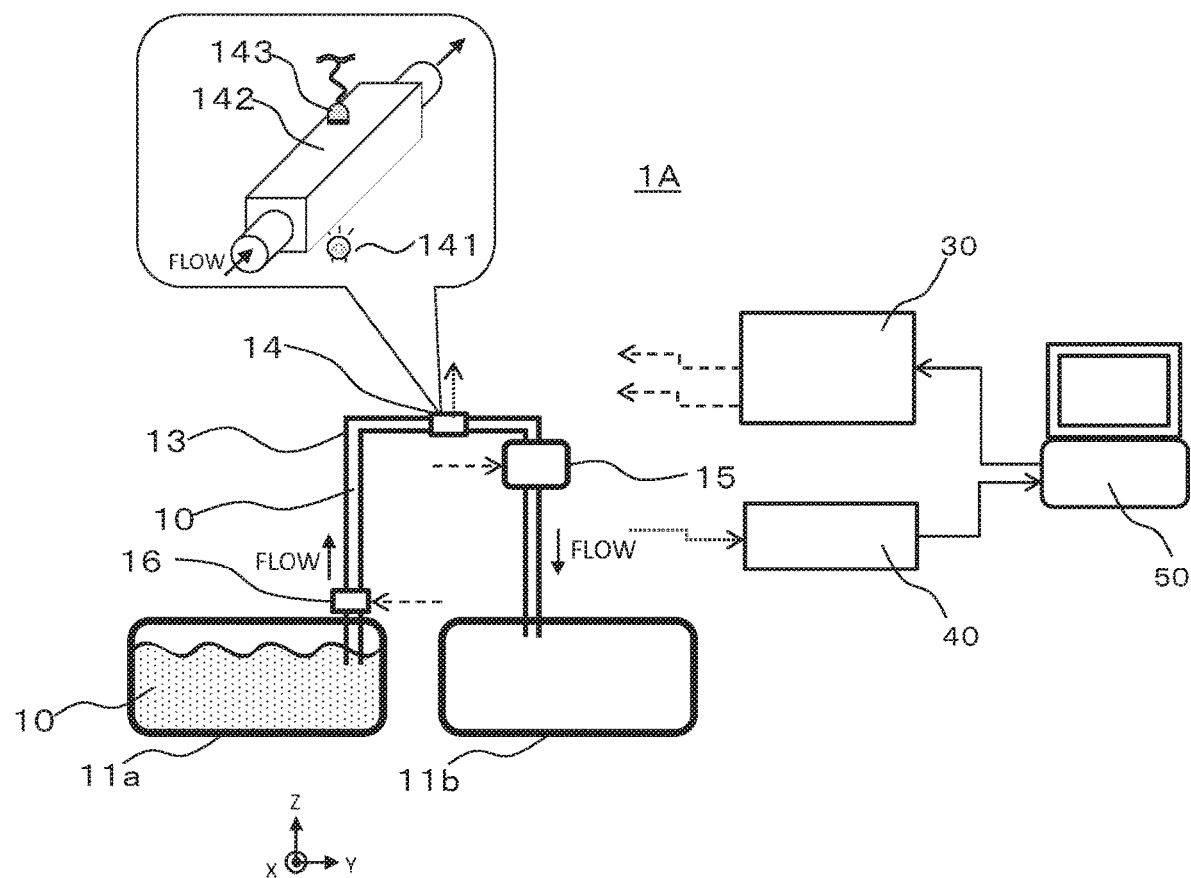
FIG. 1 is a view for illustrating an example of a schematic configuration of an optical analysis apparatus according to a first embodiment of the present invention.

A plurality of embodiments of the present invention are now described with reference to the drawings. In all the drawings for illustrating each of the embodiments, the same parts are denoted by the same reference numeral or symbol as a rule, and overlapping description thereof is omitted. In description of a configuration of each embodiment, for ease of understanding, an orthogonal coordinate system having X, Y, and Z axes is used. The X and Y axes represent directions on a horizontal plane, and the Z axis represents a vertical direction. As a matter of course, even when the configuration of each embodiment does not match with the X, Y, and Z axes in a strict sense, changes are allowed within a range of enabling achievement of substantially the same actions and effects.

First Embodiment

FIG. 1 is a view for illustrating an example of a schematic configuration of an optical analysis apparatus 1A according to a first embodiment of the present invention. The optical analysis apparatus 1A includes a flow passage 13, a measurement unit 14, a pump 15, an introduction unit 16, a control device 30, a measurement device 40, and an analysis device 50. The control device 30, the measurement device 40, and the analysis device 50 may be collectively referred to as a controller, may be integrated to form a controller, or may form a controller with at least some of those components.

An inflow port of the flow passage 13 is connected to a vessel 11a, and an outflow port of the flow passage 13 is connected to a vessel 11b. In the first embodiment, a substance 10 (corresponding to a first substance) being liquid to be subjected to optical analysis is stored in the vessel 11a. The substance 10 flows through the flow passage 13 and is discharged to the vessel 11b. The flow passage 13 may be a tube or a pipe which is made of a material such as glass, stainless steel, or polymer resin.

FIG. 1 is an illustration of an example in which the substance 10 is sucked up by a force of the pump 15 from the vessel 11a to the flow passage 13, flows through the flow passage 13, and is discharged to the vessel 11b. As a matter of course, as in the case of directly sucking up water from a river, a sea, or a lake, the vessel 11a may be omitted. Moreover, the substance 10 may be directly discharged to an outside without use of the vessel 11b. Further, the vessel 11a and the vessel 11b may be connected to each other, or the outflow port of the flow passage 13 may be connected to the vessel 11a, to thereby return the discharged substance 10 to the vessel 11a.

The measurement unit 14 is a measurement region for optical measurement of the substance 10. The measurement unit 14 is provided to the flow passage 13, specifically, at a position between the inflow port and the outflow port of the flow passage 13 and on downstream of the introduction unit 16. As illustrated in the enlarged view in FIG. 1, the measurement unit 14 includes, for example, a light source unit 141, a transparent portion 142, and a light receiving unit 143. The light source unit 141 and the light receiving unit 143 are arranged on both sides of the transparent portion 142, and at least part of light emitted from the light source unit 141 passes through the transparent portion 142 (is irradiated onto the substance 10 and bubbles described later in the transparent portion 142) and is received by the light receiving unit 143.

The transparent portion 142 is a casing which has a region having transmissivity with respect to light emitted from the light source unit 141 and light to be measured by the light receiving unit 143. In the example illustrated in FIG. 1, the transparent portion 142 is formed of quartz glass having a rectangular box shape, and a space having a rectangular box shape is formed in the transparent portion 142. Both ends of the internal space in a flow direction have openings for allowing the substance 10 to flow therethrough.

For the optical analysis which is performed using the measurement unit 14, there is used a spectroscopic analysis method using, for example, infrared rays, near-infrared rays, visible rays, ultraviolet rays, fluorescent rays, or X rays. As a matter of course, an image pickup device may be provided to the measurement unit 14 to enable optical observation of a state and a form of a substance in place of or together with the optical analysis. For example, observation may be performed for the number and shapes of solid components such as fine particles or cells in the liquid.

The introduction unit 16 is an introduction region for introducing gas (corresponding to a second substance) to the flow passage 13. The introduction unit 16 is provided to the flow passage 13, specifically, at a position between the inflow port and the outflow port of the flow passage 13 and on upstream of the measurement unit 14. The introduction unit 16 includes, for example, a valve or a cylinder to be mechanically or electrically actuated, and is capable of introducing gas, which is injected from an external tank or a vessel, to the flow passage 13 at a controlled timing with a controlled amount. As described later, the introduction unit 16 introduces the gas to the flow passage 13, thereby being capable of dividing the substance 10 flowing through the flow passage 13 with use of bubbles.

It is preferred that, as the gas to be introduced to the flow passage 13, gas which does not react with the substance 10 flowing through the flow passage 13 be selected. Depending on properties of the substance 10, for example, there may be selected air, nitrogen, oxygen, carbon dioxide, or argon.

The control device 30 is configured to control operations of actuation parts such as the pump 15 and the introduction unit 16. For example, the control device 30 transmits various control commands to the pump 15 to control the flow speed of the substance 10 in the flow passage 13. Further, for example, the control device 30 transmits various control commands to the introduction unit 16 to control introduction timings of the bubbles and sizes of the bubbles. The control device 30 may be operated in accordance with commands from the analysis device 50.

The measurement device 40 controls operations of the light source unit 141 and the light receiving unit 143. For example, the measurement device 40 controls on/off and luminance of the light emitted from the light source unit 141. Further, for example, the measurement device 40 controls the light receiving unit 143 to acquire measurement data indicating the brightness of the received light and outputs the measurement data to the analysis device 50. The measurement device 40 may be operated in accordance with a command from the analysis device 50. The measurement device 40 may control the image pickup device to acquire image data and output the image data to the analysis device 50.

The analysis device 50 is a device which performs optical analysis based on the measurement data from the measurement device 40, and is a terminal such as a personal computer. The function of executing the optical analysis such as the spectroscopic analysis is implemented by, for example, an application program. The analysis device 50 may transmit control commands to the control device 30 and the measurement device 40. The analysis device 50 may analyze the measurement data input from the measurement device 40 and transmit control commands determined based on a result of the analysis. The analysis device 50 may receive an operation by a user and display the analysis result to a user. Although illustration is omitted, the terminal includes, for example, a CPU, a storage device, a main memory, and an interface for communication with the measurement device 40. The various functions of the analysis device 50 described above are stored in the storage device as an application program as mentioned above. The CPU reads the application program from the storage device, loads the application program to the main memory, and executes the application program, to thereby achieve various functions.

Next, description is made of an optical analysis method which is performed using the above-mentioned optical analysis apparatus 1A. In the optical analysis method, the introduction unit 16 introduces at least two bubbles to the flow passage 13, to thereby divide the substance 10 flowing through the flow passage 13. Then, the substance 10 and the bubbles passing through the transparent portion 142 are irradiated with light, and measurement is performed. Further, the analysis device 50 associates a sampling time at which the substance 10 is sampled in the flow passage 13 with a measurement time at which the substance 10 is measured in the transparent portion 142. Now, detailed description is made.

The substance 10 in the vessel 11a is continuously sucked up (sampled) by the operation of the pump 15 through the inflow port of the flow passage 13, passes through the flow passage 13, and is discharged to the vessel 11b through the outflow port. The substance 10 flowing through the flow passage 13 is divided by the bubbles which are injected a plurality of times at intervals from the introduction unit 16.

Figure 2:
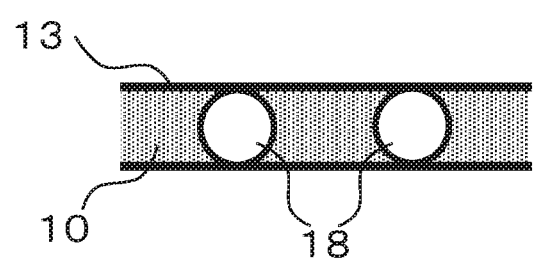
FIG. 2 is a schematic view for illustrating a state in which a substance in a flow passage is divided by two bubbles.

FIG. 2 is a schematic view for illustrating a state in which the substance in the flow passage is divided by two bubbles. As illustrated in FIG. 2, the substance 10 in the flow passage 13 is divided by two bubbles 18. With this, the substance 10 (subjected to measurement) in the region sandwiched by the two bubbles 18 is prevented from being mixed with the substance 10 which is present in regions on outer sides over the bubbles 18.

It is preferred that a distance between the inflow port of the flow passage 13 through which the substance 10 is sampled and the introduction unit 16 by which the gas is introduced be set as short as possible. This is because mixing of substances given before and after the sampling time may occur during a period from sampling of the substance to dividing with the bubbles 18. It is preferred that the introduction unit 16 for gas be arranged at a terminal end of the flow passage 13 to which the substance 10 is sampled.

Figure 3:
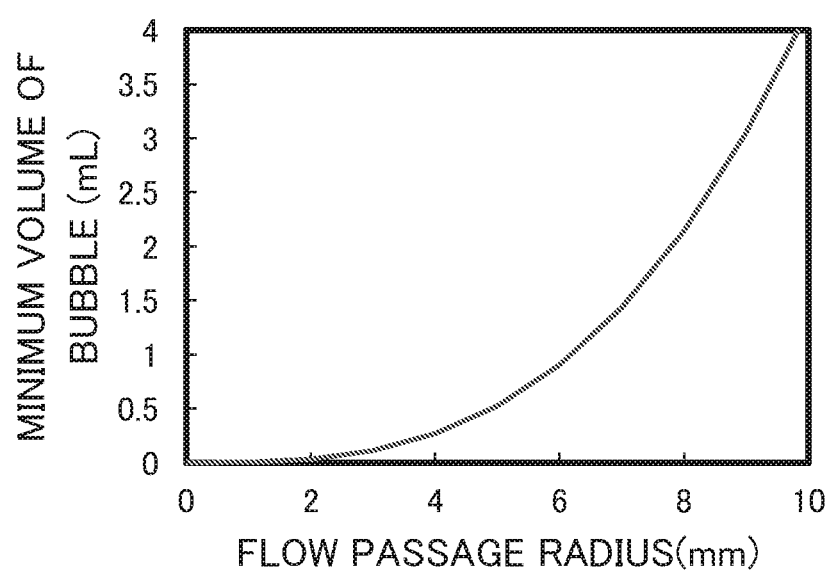
FIG. 3 is a graph for showing an example of a relationship between a radius of the flow passage and a minimum volume of the bubble required for dividing the flow passage.

FIG. 3 is a graph for showing an example of a relationship between a radius of the flow passage and a minimum volume of the bubble required for dividing the flow passage. The minimum volume of the bubble required for dividing the substance 10 in the flow passage 13 can be estimated, for example, in the following manner. Assuming that the flow passage 13 has a circular cross section, and the bubble 18 is a sphere, a sphere having a radius equal to the flow passage radius can just divide the substance 10 in the flow passage 13. When the flow passage radius is represented by r (mm), and a volume of the bubble 18 is represented by V (mL), $V=(4\pi r^3)/3{,}000$ is satisfied. For example, in a case of a flow passage radius r=5 mm, when the bubble 18 is formed by introducing gas of 0.52 mL or more to the flow passage 13, the substance 10 in the flow passage 13 can be divided.

Now, description is made with reference to FIG. 1 again. The substance 10 and the plurality of bubbles 18 flow through the flow passage 13 and pass through the transparent portion 142. The substance 10 and the plurality of bubbles 18 passing through the transparent portion 142 are irradiated with light from the light source unit 141. The analysis device 50 acquires measurement data (for example, spectrum data) through the measurement device 40 in a chronological order, and records the acquired measurement data in the storage device. The analysis device 50 is capable of determining a composition of the substance 10 through use of the acquired spectrum data and a calibration model created in advance.

A position at which the substance 10 is sampled and a position at which the substance 10 is measured are different from each other. Thus, it is required that the time at which the substance 10 is sampled and the time at which the sampled substance 10 is measured be specified in association with each other. In the first embodiment, the analysis device 50 executes such processing.

Figure 4:
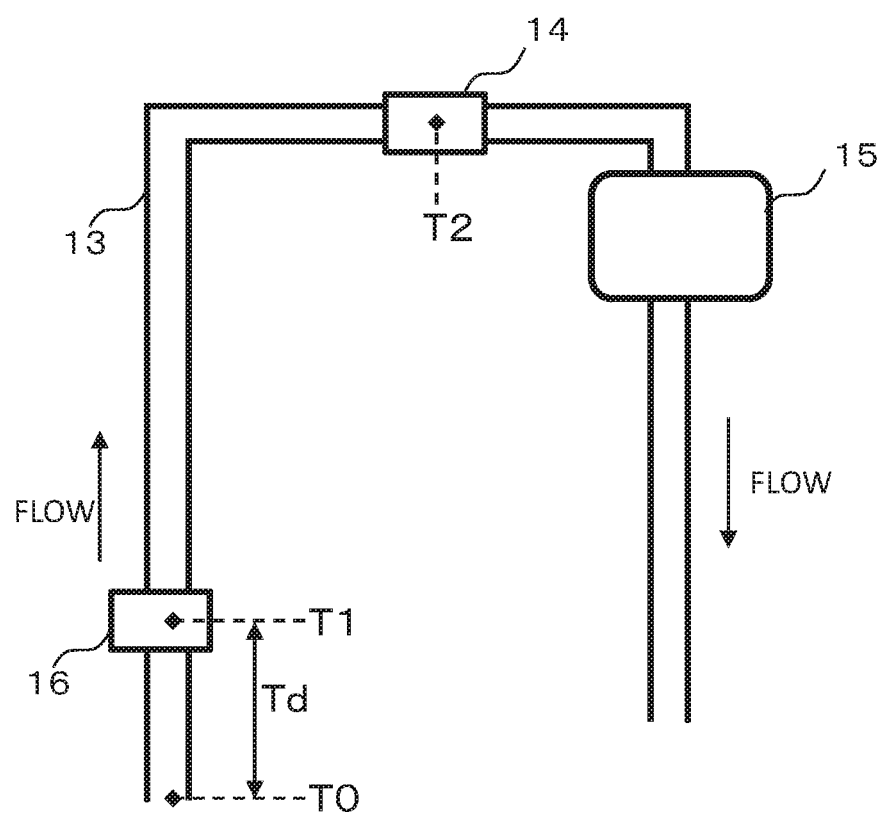
FIG. 4 is an explanatory view for illustrating an example of positions corresponding to a sampling time and a measurement time.

FIG. 4 is an explanatory view for illustrating an example of positions corresponding to the sampling time and the measurement time. In FIG. 4, the sampling time of the substance 10 is indicated by T0. The introduction time of the bubble 18 is indicated by T1. The measurement time is indicated by T2.

The introduction time T1 may be considered, for example, as a time which is the same as the time at which the introduction unit 16 introduces the bubble 18. The analysis device 50 is capable of acquiring from the control device 30, for example, the time at which the control device 30 outputs the control command for causing the introduction unit 16 to output gas as the introduction time T1.

The sampling time T0 may be considered, for example, as the time determined by subtracting a movement time period, which is calculated based on a distance Td from the inflow port of the flow passage 13 to the introduction unit 16 and the flow speed of the substance 10, from the introduction time T1. The analysis device 50 is capable of calculating the flow speed, for example, based on the speed of the pump 15 controlled by the control device 30. Further, the analysis device 50 is capable of calculating the movement time period based on the distance Td stored in advance in the storage unit and the calculated flow speed. When the distance Td is 0, the introduction time T1 can be considered as the sampling time T0.

The measurement time T2 can be determined, for example, based on the time at which the bubble 18 is detected by the measurement unit 14. The analysis device 50 analyzes the chronological measurement data from the measurement device 40 using, for example, spectrum data unique to the bubble stored in advance in the storage unit, and specifies a time T2' at which the spectrum data of the bubble 18 is detected. Then, the analysis device 50 can calculate the detection time T2' of the specified bubble 18 or the time after elapse of a predetermined time period from the detection time T2' as the measurement time T2 of the substance 10. The substance 10 and the bubble 18 have different spectrum obtained through the optical analysis. Thus, the bubble 18 can be determined.

FIG. 5 is an explanatory table for showing an example of a determination method for the sampling time. Description is made of the case in which the bubbles 18 are introduced a plurality of times at intervals. When the introduction of the bubbles 18 is started, the analysis device 50 sequentially increments a bubble number from an initial value each time the bubble 18 is introduced, and records the same. Further, the analysis device 50 associates each bubble number with the introduction time T1, and records the same. Further, the analysis device 50 associates each bubble number with the detection time T2', and records the same. Further, the analysis device 50 sequentially increments a sample number of the substance 10 from an initial value each time the bubble 18 is detected, associates the sample number with the bubble number, and records the same. Further, the analysis device 50 associates each sample number with the sampling time T0 calculated based on the introduction time T1 associated with the sample number, and records the same. Further, the analysis device 50 associates each sample number with the measurement time T2 calculated based on the detection time T2' associated with the sample number, and records the same.

In the data configuration example shown in FIG. 5, the substance 10 sandwiched between the bubble 18 of the bubble number "1" and the bubble 18 of the bubble number "2" is of the sample number "1". Similarly, the substance 10 sandwiched between the bubble 18 of the bubble number "2" and the bubble 18 of the bubble number "3" is of the sample number "2".

As described above, the time information related to each bubble 18 introduced to the flow passage 13 is recoded in order, thereby being capable of specifying time information related to each sample substance 10 divided by the bubbles 18. The analysis device 50 is capable of extracting spectrum data of each sample substance 10 through use of the measurement time T2 of each sample substance 10 from among spectrum data acquired in a chronological order. Thus, information related to a composition of the substance 10 at each sampling time can be specified, analyzed, and output to a display device or a storage device.

In the above, description is made of the first embodiment of the present invention. In the optical analysis apparatus according to the first embodiment, the substance sampled to the flow passage is divided by at least two bubbles. With this, the sample substance sandwiched between the bubbles is prevented from being mixed with another sample substance on opposite sides over the bubbles, thereby being capable of performing accurate analysis of the substance given at the sampling time. Further, in the optical analysis apparatus according to the first embodiment, the sampling time and the measurement time of the sample substance are associated with each other and specified based on positions of the bubbles. With this, measurement data such as spectrum data of the sample substance can be accurately specified.

Figure 6A:
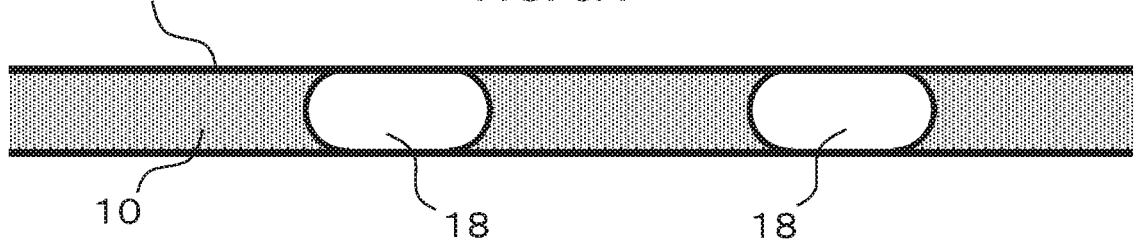
FIG. 6A to FIG. 6C are schematic views for illustrating various forms of bubbles to be introduced to the flow passage.
Figure 6B:
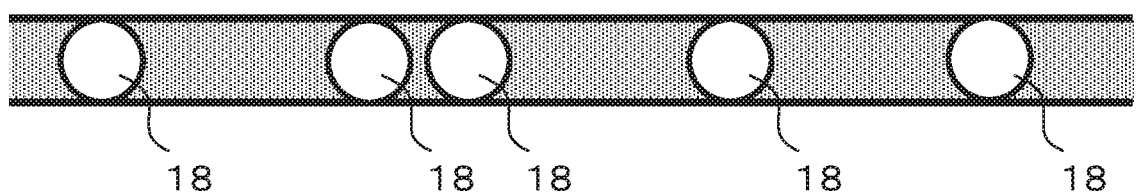
Figure 6C:
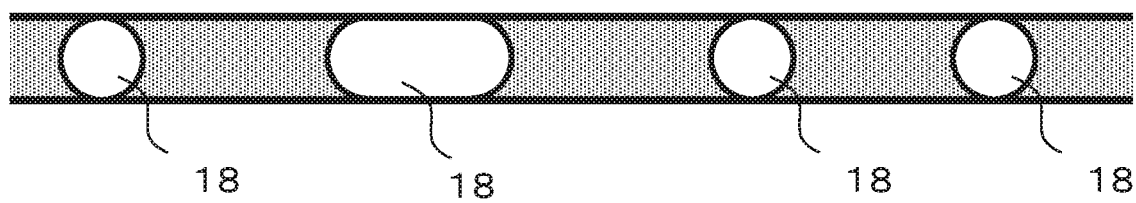

In the above-mentioned example, the introduction unit 16 introduces gas having the same sphere shape at predetermined intervals (for example, equal intervals). However, the introduction unit 16 may introduce bubbles of various shapes or introduce bubbles in various patterns (intervals). FIG. 6A to FIG. 6C are schematic views for illustrating various forms of the bubbles 18 introduced to the flow passage 13.

In FIG. 6A, the introduction unit 16 introduces bubbles 18 each having an elongated sphere shape that is longer in the flow direction as compared with the spheres illustrated in FIG. 2. In this case, a separation distance between the substances 10 divided by the bubble 18 becomes longer, thereby being capable of more effectively suppressing mixing of the divided substances 10.

In FIG. 6B, the introduction unit 16 introduces the bubbles 18 each having a sphere shape, for example, at equal intervals, and introduces the bubbles 18 at shorter intervals at predetermined timings. As a specific example, the bubbles 18 are introduced every 10 seconds, and two bubbles 18 are sequentially introduced every 1 minute. In such a manner, the generation pattern of the bubbles 18 can be used as a signal pattern. For example, when the analysis device 50 detects a pattern of sequential two bubbles 18, the detection time of the pattern can be used as a trigger or a reference for some processing. For example, the sample substance 10 given immediately after that detection time may be specified as the sample not to be subjected to the analysis, may be specified as the sample to be subjected to more detailed analysis than another sample substance 10, or may be subjected to certain processing such as irradiation of the sample substance 10 with light having a certain wavelength.

In FIG. 6C, the introduction unit 16, for example, introduces bubbles 18 each having a sphere shape at equal intervals, and introduces the bubble 18 having the elongated sphere shape at a predetermined timing. As a specific example, the spherical bubbles 18 are introduced every 10 seconds, and the bubbles 18 each having the elongated sphere shape are introduced every 1 minute. Also in this case, similarly to the case of FIG. 6B, the generation pattern including the shapes of the bubbles 18 can be used as a signal pattern. The analysis device 50 may distinguish a shape of one bubble 18 itself (for example, a sphere or an elongated sphere) through use of, for example, spectrum data, and use the same as a trigger.

Through introduction of the bubbles 18 each having the elongated sphere shape or the bubbles 18 each having an elongated bar shape which are larger than the bubbles 18 having the elongated sphere shape, bubbles (bubbles other than the bubbles 18) adhering to an inner wall of the flow passage 13 (including an inner wall of the transparent portion 142) can effectively be removed. For example, bubbles generated by stirring or bubbling in the vessel 11a, or bubbles generated from gas dissolved in the substance 10 stagnate in the flow passage 13 in some cases. In particular, adhesion of the bubbles in the transparent portion 142 has a significant influence on a result of the optical analysis. The bubbles adhering in the flow passage 13 can be removed by being swept by larger bubbles 18 or being merged with larger bubbles 18. Thus, the introduction unit 16 may be controlled so as to introduce the bubbles 18 at a predetermined timing only for the purpose of removal of bubbles.

Further, the analysis device 50 may control the pump 15 in accordance with an instruction given by a user or in accordance with a preset schedule. For example, when continuous analysis is to be performed, or when it is desired that the substance 10 be prevented from stagnating in the flow passage 13, the pump 15 is always actuated. Further, for example, when the analysis is not to be performed for a certain period of time, for energy saving, the pump 15 is stopped or is actuated at low speed. When the analysis is to be performed, the pump 15 is actuated or is actuated at a predetermined speed. Further, for example, the pump 15 is actuated at high speed for the purpose of preventing stagnation of the substance 10 or removing the bubbles adhering in the flow passage 13. When the analysis is to be performed, the pump 15 is actuated at a predetermined speed.

Second Embodiment

An optical analysis apparatus according to a second embodiment of the present invention includes a discharge unit. In the following, matters different from those of the first embodiment are described.

Figure 7:
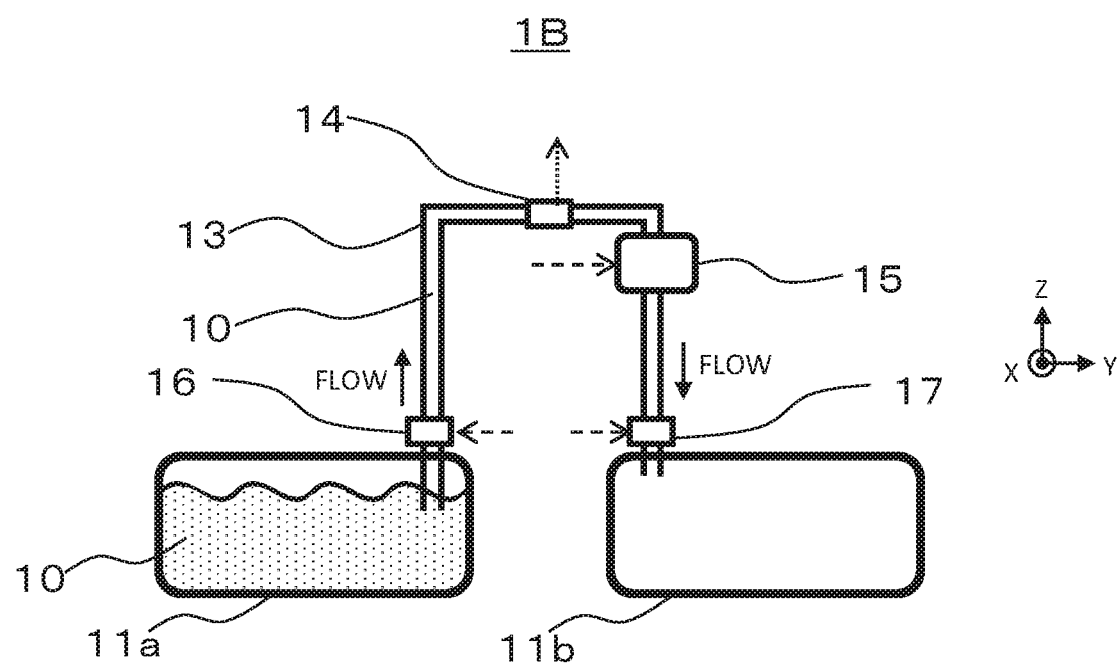
FIG. 7 is a view for illustrating an example of a schematic configuration of an optical analysis apparatus according to a second embodiment of the present invention.

FIG. 7 is a view for illustrating an example of a schematic configuration of an optical analysis apparatus 1B according to the second embodiment of the present invention. In FIG. 7, illustration of the controller is omitted. The optical analysis apparatus 1B includes a discharge unit 17.

The discharge unit 17 is a region in which gas is separated from the substance 10 flowing through the flow passage 13 and is discharged. The discharge unit 17 is provided to the flow passage 13, specifically, at a position between the inflow port and the outflow port of the flow passage 13 and on downstream of the measurement unit 14. A configuration of the discharge unit 17 is not particularly limited. However, for example, the discharge unit 17 can be formed by having an opening portion with an open upper side in an outer peripheral wall of the flow passage 13 which extends in an up-and-down direction. The bubbles 18 flowing downward together with the substance 10 are separated and discharged to an outside through the opening portion. Further, for example, the discharge unit 17 can be formed by providing a filter, which is configured to allow only the gas to pass therethrough, to the outer peripheral wall of the flow passage 13 which extends in the up-and-down direction. The bubbles 18 flowing downward together with the substance 10 are separated and discharged to an outside through the filter.

When the substance 10 and the bubbles 18 are discharged together to the vessel 11b as in the first embodiment, foaming of the substance 10 may occur depending on a kind of the substance 10, and foam is accumulated on an upper surface of the substance 10 in the vessel 11b or in an upper portion of the vessel 11b. Further, when bubbles included in the accumulated foam burst, the substance 10 may scatter. In the second embodiment, the discharge unit 17 is provided, thereby being capable of suppressing such foaming or bursting of bubbles.

Third Embodiment

An optical analysis apparatus according to a third embodiment of the present invention is connected to one vessel. In the following, matters different from those of the second embodiment are described.

Figure 8:
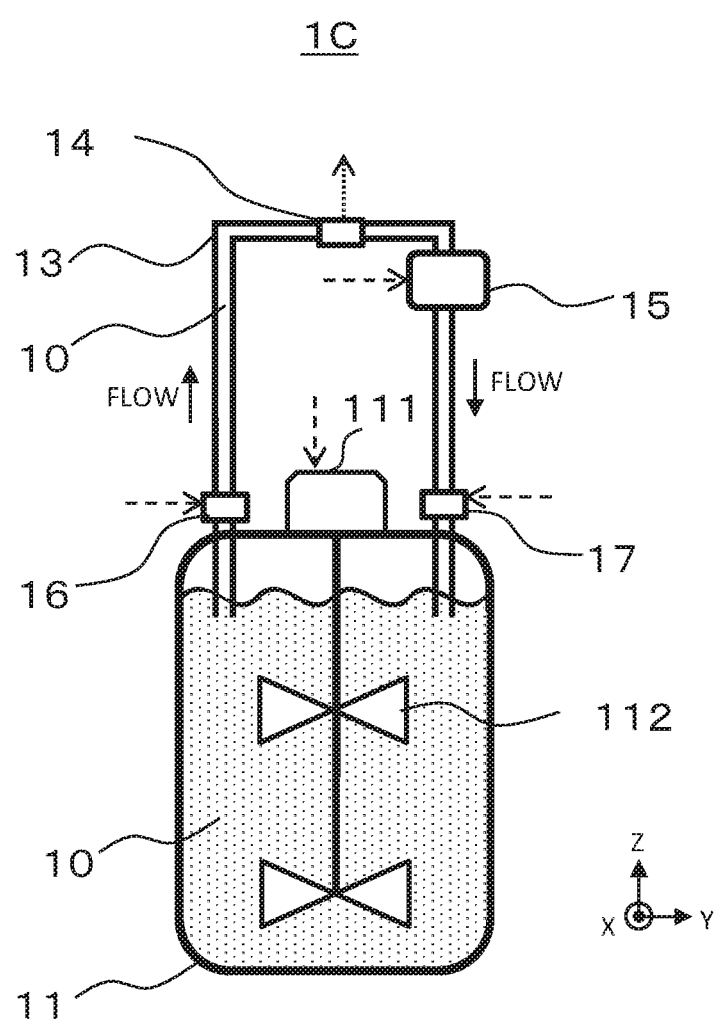
FIG. 8 is a view for illustrating an example of a schematic configuration of an optical analysis apparatus according to a third embodiment of the present invention.

FIG. 8 is a view for illustrating an example of a schematic configuration of an optical analysis apparatus 1C according to the third embodiment of the present invention. In FIG. 8, illustration of the controller is omitted. The flow passage 13 is connected to the vessel 11, and the inflow port and the outflow port are arranged in the vessel 11. In the third embodiment, the substance 10 being liquid is stored in the vessel 11, flows through the flow passage 13, and is discharged to the vessel 11. That is, the substance 10 circulates. The vessel 11 is, for example, a stirring vessel or a reaction vessel, and includes stirring blades 112 and a drive unit 111 configured to rotate the stirring blades 112. The rotation speed of the drive unit 111 is, for example, controlled through the control device 30 in accordance with a control command of the analysis device 50.

It is preferred that the above-mentioned configuration of circulating the substance 10 be used, for example, in a case in which the substance 10 is not changed in quality by the optical analysis or in a case in which there is no influence on the substance 10 in the vessel 11 even when the substance 10 having been changed in quality by the optical analysis is returned to the vessel 11. The substance 10 having been subjected to the optical analysis is returned to the vessel 11, thereby being capable of performing continuous measurement while maintaining a constant amount of the substance in the vessel 11.

Further, as the gas to be introduced by the introduction unit 16, it is preferred that gas which does not react with the substance 10 be selected. The gas to be introduced from the introduction unit 16 may be the same as or be different from the gas to be sealed in or introduced to the vessel 11. When those gases are the same, a pipe (not shown) for introducing the gas to the vessel 11 may be branched and connected to the introduction unit 16.

The discharge unit 17 separates the bubbles 18 in the flow passage 13 from the substance 10 and returns the substance 10 in the flow passage 13 to the vessel 11. When there is no influence of, for example, foaming of the bubbles, the discharge unit 17 may be omitted.

Fourth Embodiment

An optical analysis apparatus according to a fourth embodiment of the present invention includes a plurality of flow passages. In the following, matters different from those of the third embodiment are described.

Figure 9:
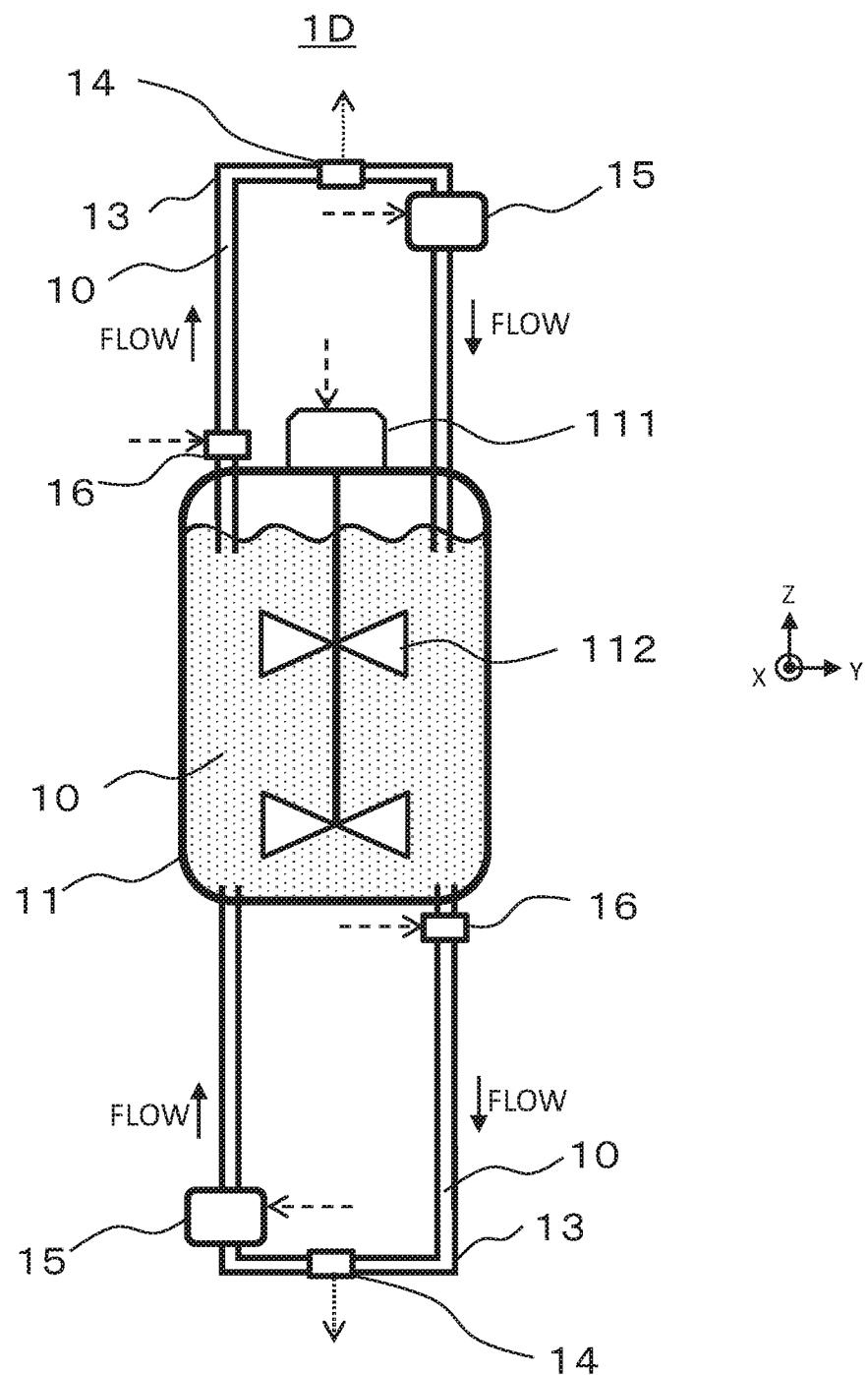
FIG. 9 is a view for illustrating an example of a schematic configuration of an optical analysis apparatus according to a fourth embodiment of the present invention.

FIG. 9 is a view for illustrating an example of a schematic configuration of an optical analysis apparatus 1D according to a fourth embodiment of the present invention. In FIG. 9, illustration of the controller is omitted. The optical analysis apparatus 1D includes two flow passages 13 on an upper side and a lower side of the vessel 11, respectively, and the measurement unit 14, the pump 15, and the introduction unit 16 are provided to each of the flow passages 13. The inflow port and the outflow port of each flow passage 13 are arranged in the vessel 11. The substance 10 is stored in the vessel 11, flows through the flow passage 13 on the upper side, and is discharged to the vessel 11. That is, the substance 10 circulates. Further, the substance 10 is stored in the vessel 11, flows through the flow passage 13 on the lower side, and is discharged to the vessel 11. That is, the substance 10 circulates. Similarly to the third embodiment, the optical analysis apparatus 1D may include the discharge unit 17 to at least one of the flow passage 13 on the upper side and the flow passage 13 on the lower side.

With such a configuration, the optical analysis apparatus 1D performs optical analysis for each of an upper region and a lower region of the substance 10 in the vessel 11, thereby being capable of measuring, for example, composition distribution (composition at respective positions and position dependency) of the substance in the vessel 11.

The number and positions of the flow passages 13 provided to the optical analysis apparatus 1D are not limited to those of the illustrated example. For example, a plurality of flow passages 13 having different heights (Z-axis direction) of the inflow ports in the vessel 11 may be provided on an upper side of the vessel 11. Even with such a configuration, for example, composition distribution (composition at respective positions or positional dependency) of the substance in the vessel 11 can be measured. A plurality of flow passages 13 having different heights of the inflow ports in the vessel 11 may be provided also on a lower side of the vessel 11.

Fifth Embodiment

An optical analysis apparatus according to a fifth embodiment of the present invention includes a flow passage on a side surface of the vessel. In the following, matters different from those of the third embodiment are described.

Figures 10A, 10B:
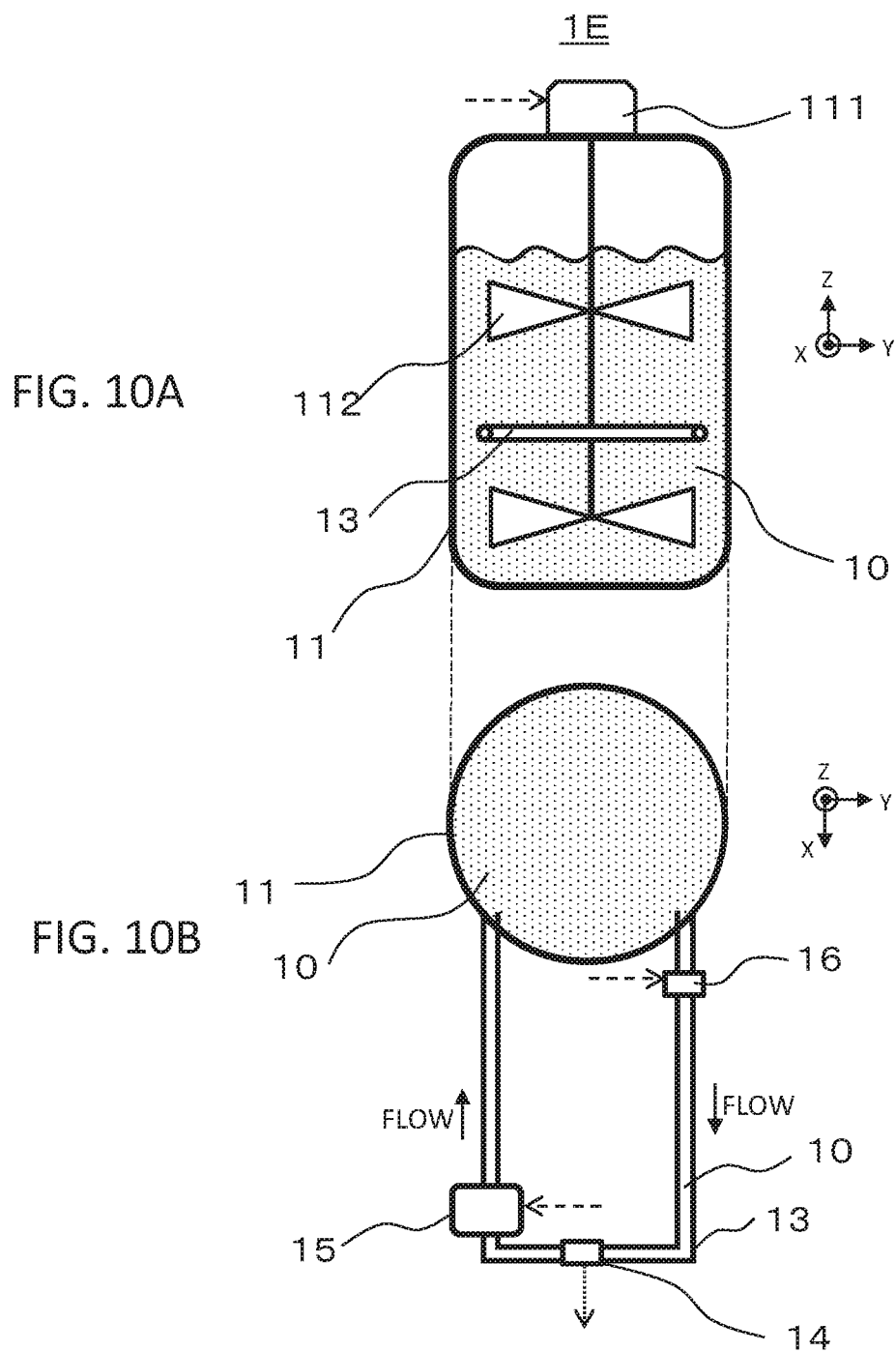
FIG. 10A and FIG. 10B are views for illustrating an example of a schematic configuration of an optical analysis apparatus according to a fifth embodiment of the present invention.

FIG. 10A and FIG. 10B are views for illustrating an example of a schematic configuration of an optical analysis apparatus 1E according to the fifth embodiment of the present invention. FIG. 10A is a side view for illustrating the vessel 11. FIG. 10B is a top view for illustrating the vessel 11. In FIG. 10A and FIG. 10B, illustration of the controller is omitted. Further, in FIG. 10A, illustration of the measurement unit 14, the pump 15, and the introduction unit 16 is omitted. Further, in FIG. 10B, illustration of the drive unit 111 and the stirring blades 112 is omitted.

The flow passage 13 is provided on the side surface of the vessel 11, and the inflow port and the outflow port of the flow passage 13 are arranged in the vessel 11. The optical analysis apparatus 1E may include, similarly to the third embodiment, the discharge unit 17 to the flow passage 13.

With such a configuration, for example, a composition of the substance in a region corresponding to the height of the inflow port in the vessel 11 can be measured.

The number and positions of the flow passages 13 provided to the optical analysis apparatus 1E are not limited to those of the illustrated example. For example, a plurality of flow passages 13 having different heights of the inflow ports in the vessel 11 may be provided to the side surface of the vessel 11 along a height direction. With such a configuration, for example, composition distribution (composition at respective height positions or positional dependency) of the substance in the vessel 11 can be measured.

Sixth Embodiment

An optical analysis apparatus according to a sixth embodiment of the present invention includes an introduction unit and a discharge unit in a vessel. In the following, matters different from those of the third embodiment are described.

Figure 11:
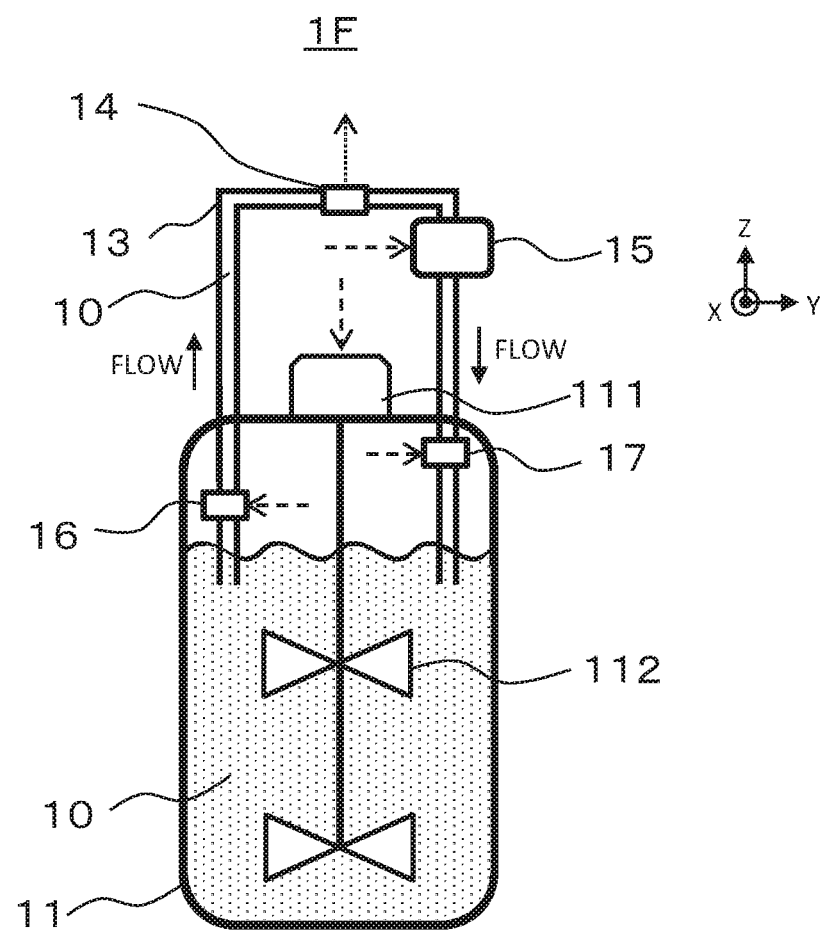
FIG. 11 is a view for illustrating an example of a schematic configuration of an optical analysis apparatus according to a sixth embodiment of the present invention.

FIG. 11 is a view for illustrating an example of a schematic configuration of an optical analysis apparatus 1F according to the sixth embodiment of the present invention. In FIG. 11, illustration of the controller is omitted. The introduction unit 16 and the discharge unit 17 are arranged in the vessel 11. The introduction unit 16 uses gas in the vessel 11 to introduce the bubbles 18 to the flow passage 13. The discharge unit 17 discharges gas having been separated from the flow passage 13 to the vessel 11. A gas intake port of the introduction unit 16 is arranged in a region of the vessel 11 in which the substance 10 is not present. A gas discharge port of the discharge unit 17 is arranged in a region of the vessel 11 in which the substance 10 is not present. Control lines and power supply lines to be connected to the introduction unit 16 and the discharge unit 17 are each taken out to the outside of the vessel 11.

With such a configuration, contamination due to entry of air, dust, or bacteria from the outside into the substance 10 in the vessel 11 can be prevented. Further, the introduction unit 16 uses the gas sealed in the vessel 11. Thus, there is no need to newly prepare other gas or install a pipe for supplying gas. Further, there is no need to consider the influence of a reaction between other newly prepared gas and the substance 10.

Further, in the sixth embodiment, the optical analysis apparatus 1F is capable of performing optical analysis not only for the substance 10 divided by the bubbles 18 but also for a composition of the bubbles 18 divided by the substance 10. This is because, in the sixth embodiment, gas is not introduced from the outside, and hence the gas sealed in the vessel 11 can be divided by the substance 10.

Seventh Embodiment

According to a seventh embodiment of the present invention, provided is a manufacturing system for a substance including the optical analysis apparatus according to the above-mentioned sixth embodiment. In the following, matters different from those of the sixth embodiment are described.

Figure 12:
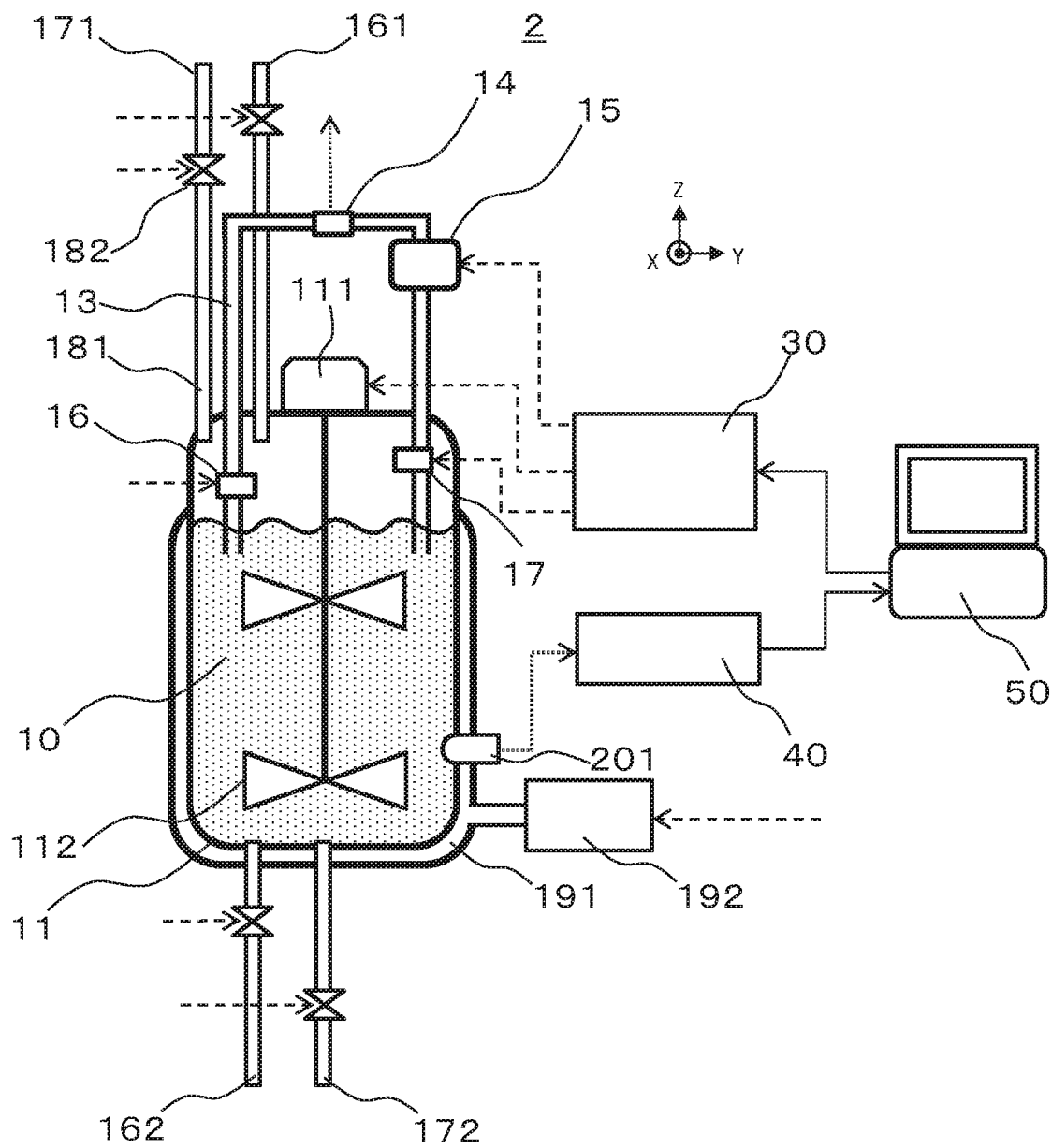
FIG. 12 is a view for illustrating an example of a schematic configuration of a manufacturing system for a substance according to a seventh embodiment of the present invention.

FIG. 12 is a view for illustrating an example of a schematic configuration of a manufacturing system 2 for a substance according to the seventh embodiment of the present invention. In addition to the optical analysis apparatus 1F according to the sixth embodiment, the manufacturing system 2 includes a supply unit 161 for substance, a discharge unit 162 for a substance, a supply/discharge unit 171 for gas, and a supply unit 172 for gas. The supply unit 161, the discharge unit 162, the supply/discharge unit 171, and the supply unit 172 each include, for example, a pipe 181 and a valve 182 connected to the vessel 11. For example, a pump or a vessel may be connected to each pipe 181 on a side opposite to the vessel 11. Opening and closing of each valve 182 can be controlled by the control device 30.

Further, the manufacturing system 2 includes a thermostatic tank 191 and a temperature-adjustment device 192. The thermostatic tank 191 receives the vessel 11, and a temperature in the thermostatic tank 191 can be adjusted through control by the temperature-adjustment device 192. An operation of the temperature-adjustment device 192 is controlled by the control device 30.

One or a plurality of sensors 201 are mounted to the vessel 11. The various sensors 201 include sensors for measuring, for example, a temperature, a pressure, a gas concentration, a composition of a substance, a pH, a specific gravity, a color, a turbidity, and a conductivity. Measurement data output from the various sensors 201 is output to the analysis device 50 through the measurement device 40. Through the use of the various sensors 201, for example, when gas and liquid are present in the vessel 11, temperatures of both the gas and liquid, the gas concentration in the liquid, and the composition of the liquid can be measured.

Figure 13:
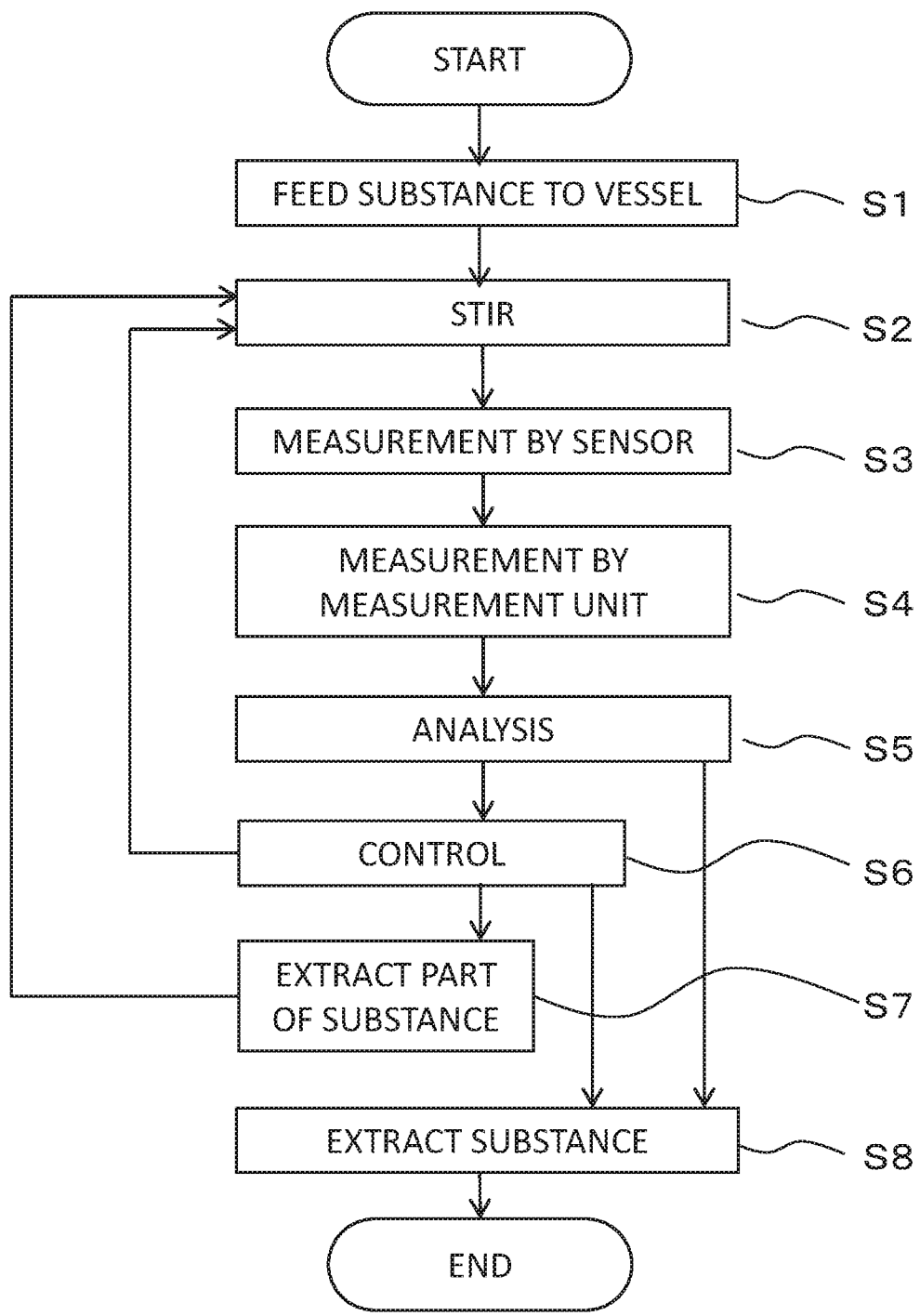
FIG. 13 is a flowchart for illustrating an example of a manufacturing method for a substance using the manufacturing system.

FIG. 13 is a flowchart for illustrating an example of the manufacturing method for a substance using the manufacturing system 2. With reference to the flowchart, description is made of a case of manufacturing a desired substance through repetition of the measurement by the various sensors 201 and the measurement unit 14 and control of various devices based on measurement data.

First, a substance being a material is fed to the vessel 11 (Step S1). In a case of manufacturing a chemical substance by a chemical reaction, the substance to be fed may be a raw material, a catalyst, or a solvent. In a case of manufacturing a biochemical substance by culture, the substance to be fed may be a medium including cells or bacteria and a nutrient. The substance being a material may be fed to the vessel 11 through the supply unit 161 for a substance. Gas being a material may be fed to the vessel 11 through the supply/discharge unit 171 for gas or the supply unit 172 for gas.

After Step S1, processings of Step S2 to Step S7 are performed. The processing of Step S2 to Step S7 may be performed in the order illustrated in FIG. 13 or in the order different from that illustrated in FIG. 13, or at least some steps may be performed simultaneously.

The substance in the vessel 11 is stirred (Step S2). Further, the measurement by the various sensors 201 and the measurement by the measurement unit 14 are performed (Step S3 and Step S4). The analysis device 50 uses the various sensor 201 to measure, for example, a temperature, a pressure, a gas concentration, a composition of a substance, a pH, a specific gravity, a color, a turbidity, and a conductivity in the vessel 11. Through the optical analysis using the measurement unit 14, for example, identification of the substance and composition analysis of the substance are performed by the analysis device 50. In a case in which the measurement unit 14 includes an image pickup device, for example, counting, shape observation, and photographing of solid components such as fine particles or cells in the liquid may be performed by the analysis device 50.

Further, the measurement data obtained in Step S3 and Step S4 are analyzed (Step S5). The analysis device 50 analyzes the measurement data in accordance with a predetermined program. Further, next control of the various devices is executed based on the analysis result obtained in Step S5 (Step S6). The analysis device 50 controls various devices associated based on the analysis result obtained in Step S5 in accordance with a predetermined program. For example, the temperature in the thermostatic tank 191 may be adjusted. Further, for example, the pressure in the vessel 11 may be adjusted through the supply/discharge unit 171 for gas or the supply unit 172 for gas. Further, for example, the substance which is the same as the substance fed in Step S1 or another substance may be fed to the vessel 11 through the supply unit 161 for a substance. Further, for example, the number of stirring, the gas concentration, or the composition of the substance may be adjusted so as to obtain appropriate reaction and culture. Further, for example, the stirring may be performed intermittently, changed in rotation direction, or stopped.

After Step S6, the processing returns to Step S2. Alternatively, after Step S6, part of the substance 10 is extracted from the vessel 11 through the discharge unit 162 (Step S7), and the processing returns to Step S2. Alternatively, after Step S6, the reaction or culture is completed or stopped, and all of the substance 10 is extracted from the vessel 11 through the discharge unit 162 (Step S8). Then, the processing of the flowchart is terminated. Alternatively, after Step S5, the reaction or culture is completed or stopped, and all of the substance 10 is extracted from the vessel 11 through the discharge unit 162 (Step S8). Then, the processing of the flowchart is terminated.

According to the seventh embodiment, in the case in which a composition or a state of the substance in the vessel changes with time, the composition or the state given at the sampling time is accurately measured, and the substance can be manufactured while executing appropriate control based on the measurement result.

The system illustrated in FIG. 12 is not limited to the illustrated configuration. For example, the number of each component may be more than one. Further, in addition to the components illustrated in FIG. 12, devices or parts which are required for manufacture of the chemical substance or culture of the biochemical substance may be provided. For example, a light source for light irradiation may be provided. Further, for example, in place of or in addition to the thermostatic tank, an electric heater or a pipe having water vapor or refrigerant passing therethrough may be provided in the vessel 11 to perform temperature control.

In the foregoing, the invention made by the inventors of the present invention is specifically described based on the plurality of embodiments. However, as a matter of course, the present invention is not limited to the embodiments described above, and various modifications can be made without departing from the gist of the present invention.

For example, the embodiments are described in detail for easy understanding of the present invention, and the present invention is not always limited to those including all the components described in the embodiments. Further, some components of one embodiment can be replaced with components of another embodiment, and components of another embodiment may be added to one embodiment. Further, for some components in each embodiment, another component may be added, omitted, or replaced.

The optical analysis apparatus according to the present invention may be used by connecting the optical analysis apparatus to various vessels, for example, to the reaction vessel for use in manufacture of a chemical substance or to the culture vessel for use in culture of a biochemical substance such as biopharamaceuticals. Further, the optical analysis apparatus may be incorporated into the manufacturing system for a substance. Further, the substance to be subjected to the optical analysis is not limited to liquid, and includes, for example, a gel-like substance, a granular substance, suspension, and emulsion. Further, the substance to be subjected to the optical analysis may be gas. In this case, the introduction unit 16 introduces liquid to divide the gas.

The present invention may be provided not only in a mode of an optical analysis (including optical observation) apparatus but also in various modes such as an optical analysis system, an optical analysis method, a manufacturing system, and a manufacturing method.

What is claimed is:

1. An optical analysis apparatus, comprising:
a flow passage, which is connected to a vessel, and is configured to allow a first substance to flow therethrough;
an introduction unit, which is provided to the flow passage, and is configured to introduce at least two second substances to the flow passage, to thereby divide the first substance flowing through the flow passage;
a measurement unit, which is provided to the flow passage, and is configured to perform measurement by irradiating the first substance and the second substances flowing through the flow passage with light; and
a controller, which is configured to record a sampling time at which the first substance divided by the second substances is sampled to the flow passage and a first measurement time at which the first substance divided by the second substances is measured.

2. The optical analysis apparatus according to claim 1, wherein the first substance sandwiched between the two second substances is subjected to measurement.

3. The optical analysis apparatus according to claim 1, wherein the first substance is liquid, and
wherein the second substances are gas.

4. The optical analysis apparatus according to claim 1, wherein the controller is configured to record, based on an introduction time at which the second substance is introduced to the flow passage, one of a time which is the same as the introduction time and a time earlier than the introduction time by a predetermined time period as the sampling time.

5. The optical analysis apparatus according to claim 1, wherein the controller is configured to record, based on a second measurement time at which the second substance is measured, one of a time which is the same as the second measurement time and a time which is earlier than the second measurement time by a predetermined time period as the first measurement time.

6. The optical analysis apparatus according to claim 1, wherein the introduction unit is configured to introduce the second substances to the flow passage so that the second substances in the flow passage have the same shape.

7. The optical analysis apparatus according to claim 1, wherein the introduction unit is configured to introduce the second substances to the flow passage so that at least one second substance of the second substances in the flow passage has a shape different from a shape of another second substance.

8. The optical analysis apparatus according to claim 1, further comprising a discharge unit, which is provided on downstream of the measurement unit along the flow passage, and is configured to discharge the second substances.

9. The optical analysis apparatus according to claim 1, further comprising a discharge unit, which is provided on downstream of the measurement unit along the flow passage, and is configured to discharge the second substances,
wherein the introduction unit and the discharge unit are provided outside the vessel.

10. The optical analysis apparatus according to claim 1, wherein a plurality of sets each including the flow passage, the introduction unit, and the measurement unit are provided, and each flow passage is connected to the vessel.

11. The optical analysis apparatus according to claim 1, further comprising a discharge unit, which is provided on downstream of the measurement unit along the flow passage, and is configured to discharge the second substances,
wherein the introduction unit and the discharge unit are provided in the vessel.

12. A manufacturing system for a substance, comprising:
a vessel which is configured to store a first substance;
a flow passage, which is connected to the vessel, and is configured to allow the first substance to flow therethrough;
an introduction unit, which is provided to the flow passage, and is configured to introduce at least two second substances to the flow passage, to thereby divide the first substance flowing through the flow passage;
a measurement unit, which is provided to the flow passage, and is configured to perform measurement by irradiating the first substance and the second substances flowing through the flow passage with light; and
a controller, which is configured to record a sampling time at which the first substance divided by the second substances is sampled to the flow passage and a first measurement time at which the first substance divided by the second substances is measured.

13. The manufacturing system according to claim 12, wherein the first substance sandwiched between the two second substances is subjected to measurement.

14. The manufacturing system according to claim 12, wherein the first substance is liquid and the second substances are gas.

15. The manufacturing system according to claim 12, wherein the controller is configured to record, based on an introduction time at which the second substance is introduced to the flow passage, one of a time which is the same as the introduction time and a time earlier than the introduction time by a predetermined time period as the sampling time.

16. The manufacturing system according to claim 12, wherein the controller is configured to record, based on a second measurement time at which the second substance is measured, one of a time which is the same as the second measurement time and a time which is earlier than the second measurement time by a predetermined time period as the first measurement time.

17. The manufacturing system according to claim 12, further comprising a discharge unit, which is provided on downstream of the measurement unit along the flow passage, and is configured to discharge the second substances.

18. The manufacturing system according to claim 12, further comprising a discharge unit, which is provided on downstream of the measurement unit along the flow passage, and is configured to discharge the second substances,
wherein the introduction unit and the discharge unit are provided outside the vessel.

19. The manufacturing system according to claim 12, wherein a plurality of sets each including the flow passage, the introduction unit, and the measurement unit are provided, and each flow passage is connected to the vessel.

20. The manufacturing system according to claim 12, further comprising a discharge unit, which is provided on downstream of the measurement unit along the flow passage, and is configured to discharge the second substances,
wherein the introduction unit and the discharge unit are provided in the vessel.

* * * * *